United States Patent
Teng et al.

(10) Patent No.: US 12,039,671 B2
(45) Date of Patent: Jul. 16, 2024

(54) VISUAL CONTENT VERIFICATION IN EXTENDED AND AUGMENTED REALITY

(71) Applicant: QUALCOMM Incorporated, San Diego, CA (US)

(72) Inventors: Diyan Teng, Santa Clara, CA (US); Mehul Soman, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 90 days.

(21) Appl. No.: 17/814,090

(22) Filed: Jul. 21, 2022

(65) Prior Publication Data

US 2024/0029360 A1    Jan. 25, 2024

(51) Int. Cl.
- *G06T 19/00* (2011.01)
- *G06F 21/55* (2013.01)
- *G06V 20/20* (2022.01)

(52) U.S. Cl.
CPC .......... *G06T 19/003* (2013.01); *G06F 21/554* (2013.01); *G06T 19/006* (2013.01); *G06V 20/20* (2022.01)

(58) Field of Classification Search
None
See application file for complete search history.

(56) References Cited

U.S. PATENT DOCUMENTS

| | | |
|---|---|---|
| 10,964,116 B2 | 3/2021 | Daniels et al. |
| 11,909,732 B1 * | 2/2024 | Mitchell ............... H04L 67/131 |
| 2017/0162177 A1 | 6/2017 | Lebeck et al. |
| 2019/0303670 A1 | 10/2019 | Bryden |
| 2019/0354699 A1 * | 11/2019 | Pekelny ............. H04L 63/0861 |
| 2019/0379671 A1 * | 12/2019 | Sundar .................... H04L 63/08 |
| 2019/0384579 A1 * | 12/2019 | Walsh ..................... G06F 9/542 |
| 2020/0065569 A1 | 2/2020 | Nduka et al. |
| 2020/0364915 A1 | 11/2020 | Ruth et al. |
| 2021/0163021 A1 | 6/2021 | Frazzoli et al. |
| 2021/0173480 A1 | 6/2021 | Osterhout et al. |
| 2021/0326428 A1 * | 10/2021 | Edwards ................ G06V 20/20 |

(Continued)

OTHER PUBLICATIONS

Bo Zhao, Daniel Z Sui, "True Lies in Geospatial Big Data: Detecting Location Spoofing in Social Media," 2017, Annals of GIS, 23:1, pp. 1-14 (Year: 2017).*

(Continued)

*Primary Examiner* — Michael J Cobb
(74) *Attorney, Agent, or Firm* — QUALCOMM Incorporated

(57) ABSTRACT

Systems and methods for detecting an unauthorized virtual object in a mobile device are disclosed. In an aspect, a mobile device may receive an image from a camera. The mobile device may detect a virtual object displayed on a display of a mobile device included in the image. The mobile device may receive data from an inertial measurement unit (IMU) after a movement of the mobile device. The mobile device may determine an estimated new position of the virtual object based on the data received from the IMU. The mobile device may determine an actual position of the virtual object after receiving the data from the IMU. The mobile device may determine a difference between the estimated new position and the actual position of the virtual object. The mobile device may determine whether the virtual object is the unauthorized virtual object based on the difference.

48 Claims, 7 Drawing Sheets

(56) References Cited

U.S. PATENT DOCUMENTS

| | | | |
|---|---|---|---|
| 2022/0012920 A1* | 1/2022 | Beith | G06F 3/1454 |
| 2023/0237192 A1* | 7/2023 | Kahan | G06F 3/011 |
| | | | 726/1 |
| 2024/0029360 A1* | 1/2024 | Teng | H04W 4/025 |

OTHER PUBLICATIONS

Fabian Kilger, Alexandre Kabil, Volker Tippmann, Gudrun Klinker, Marc-Oliver Pahl, "Detecting and Preventing Faked Mixed Reality," 2021, 2021 IEEE 4th International Conference on Multimedia Information Processing and Retrieval (MIPR), pp. 399-404 (Year: 2021).*

International Search Report and Written Opinion—PCT/US2023/024964—ISA/EPO—dated Sep. 27, 2023.

Girshick R., et al., "Rich Feature Hierarchies for Accurate Object Detection and Semantic Segmentation Tech Report (v5)", Proceedings of the IEEE Conference on Computer Vision and Pattern Recognition, Oct. 22, 2014 (Oct. 22, 2014), pp. 1-21, XP055295233, Retrieved from the Internet: URL: https://arxiv.org/pdf/1311.2524v5.pdf.

Redmon J., et al., "You Only Look Once: Unified, Real-Time Object Detection," May 9, 2016 (May 9, 2016), pp. 1-10, XP055556774, DOI: 10.1109/CVPR.2016.91, arXiv: 1506.02640v5, Retrieved from the Internet: URL: https://arxiv.org/pdf/1506.02640.pdf [retrieved on Feb. 14, 2019], The whole document.

* cited by examiner

VISUAL CONTENT VERIFICATION IN EXTENDED AND AUGMENTED REALITY

BACKGROUND OF THE DISCLOSURE

1. Field of the Disclosure

Aspects of the disclosure relate generally to extended and augmented reality. In some aspects, the disclosure relates to verification of objects within the extended and/or augmented reality.

2. Description of the Related Art

Augmented reality (AR) and extended reality (XR) devices and systems have become very popular. AR/XR devices may be used in various areas such as gaming, interne surfing, business software, map navigation, etc. Many devices such as smartphones, wearables, vehicles and smart watches may employ AR/XR technology and display AR/XR virtual objects and renderings on the displays of these devices. However, the display of virtual objects and renderings may invite unauthorized entities (e.g., hackers, viruses, malware, etc.) to display false or unauthorized virtual objects and renderings. For example, unauthorized entities may display a fake vehicle on a display of a vehicle equipped with AR/XR system to cause an accident or display a fake bank account number on a smart phone equipped AR/XR system to steal money while the user is using the smart phone to conduct online banking.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of detecting an unauthorized virtual object includes receiving an image from a camera; detecting a virtual object displayed on a display of a mobile device included in the image; receiving data from an inertial measurement unit (IMU) after a movement of the mobile device; determining an estimated new position of the virtual object based on the data received from the IMU; determining an actual position of the virtual object after receiving the data from the IMU; determining a difference between the estimated new position and the actual position of the virtual object; and determining whether the virtual object is the unauthorized virtual object based on the difference.

In an aspect, a mobile device configured to detect an unauthorized virtual object includes a memory; and at least one processor communicatively coupled to the memory, the at least one processor configured to: receive an image from a camera; detect a virtual object displayed on a display of a mobile device included in the image; receive data from an inertial measurement unit (IMU) after a movement of the mobile device; determine an estimated new position of the virtual object based on the data received from the IMU; determine an actual position of the virtual object after receiving the data from the IMU; determine a difference between the estimated new position and the actual position of the virtual object; and determine whether the virtual object is the unauthorized virtual object based on the difference.

In an aspect, a mobile device configured to detect an unauthorized virtual object includes means for receiving an image from a camera; means for detecting a virtual object displayed on a display of a mobile device included in the image; means for receiving data from an inertial measurement unit (IMU) after a movement of the mobile device; means for determining an estimated new position of the virtual object based on the data received from the IMU; means for determining an actual position of the virtual object after receiving the data from the IMU; means for determining a difference between the estimated new position and the actual position of the virtual object; and means for determining whether the virtual object is the unauthorized virtual object based on the difference.

In an aspect, a non-transitory computer-readable medium storing computer-executable instructions that, when executed by a mobile device configured to detect an unauthorized virtual object, cause the mobile device to: receive an image from a camera; detect a virtual object displayed on a display of a mobile device included in the image; receive data from an inertial measurement unit (IMU) after a movement of the mobile device; determine an estimated new position of the virtual object based on the data received from the IMU; determine an actual position of the virtual object after receiving the data from the IMU; determine a difference between the estimated new position and the actual position of the virtual object; and determine whether the virtual object is the unauthorized virtual object based on the difference.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of thereof.

DETAILED DESCRIPTION

Figure 1:
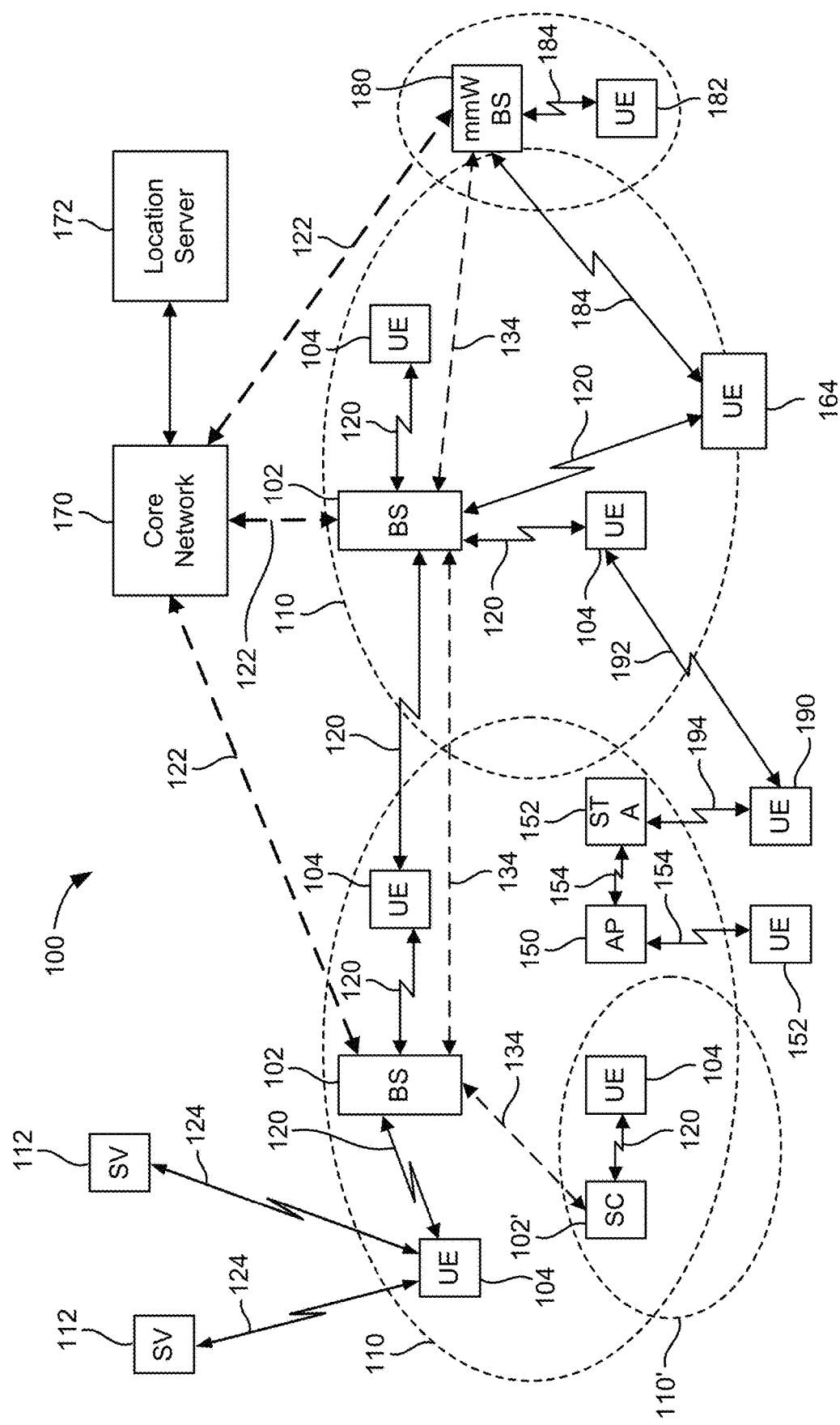
FIG. 1 illustrates an example wireless communications system according to at least one aspect of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell (SC) base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In the example of FIG. 1, one or more Earth orbiting satellite positioning system (SPS) space vehicles (SVs) 112 (e.g., satellites) may be used as an independent source of location information for any of the illustrated UEs (shown in FIG. 1 as a single UE 104 for simplicity). A UE 104 may include one or more dedicated SPS receivers specifically designed to receive SPS signals 124 for deriving geo location information from the SVs 112. An SPS typically includes a system of transmitters (e.g., SVs 112) positioned to enable receivers (e.g., UEs 104) to determine their location on or above the Earth based, at least in part, on signals (e.g., SPS signals 124) received from the transmitters.

The use of SPS signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, an SPS may include any combination of one or more global and/or regional navigation satellite systems and/or augmentation systems, and SPS signals 124 may include SPS, SPS-like, and/or other signals associated with such one or more SPS.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

In some aspects the UEs/mobile devices discussed herein incorporating AR/XR technology to display AR/XR virtual objects and renderings may include one or more aspects of the various UE's discussed above, such as the ability to directly communicate over the cellular network with the various base stations using various technologies (e.g., LTE, 5G, etc.), communicate over a WLAN network, communicate directly with another UE, etc. Therefore, in accordance with the various aspects disclosed herein the UEs described in the foregoing, may be implemented in various forms, including but not limited to smart watches, smart phones, tablets, and other devices which can perform the functionalities disclosed herein. Accordingly, it will be appreciated that the foregoing illustrations are merely examples and should not be construed to limit the various aspects disclosed herein.

Figure 2:
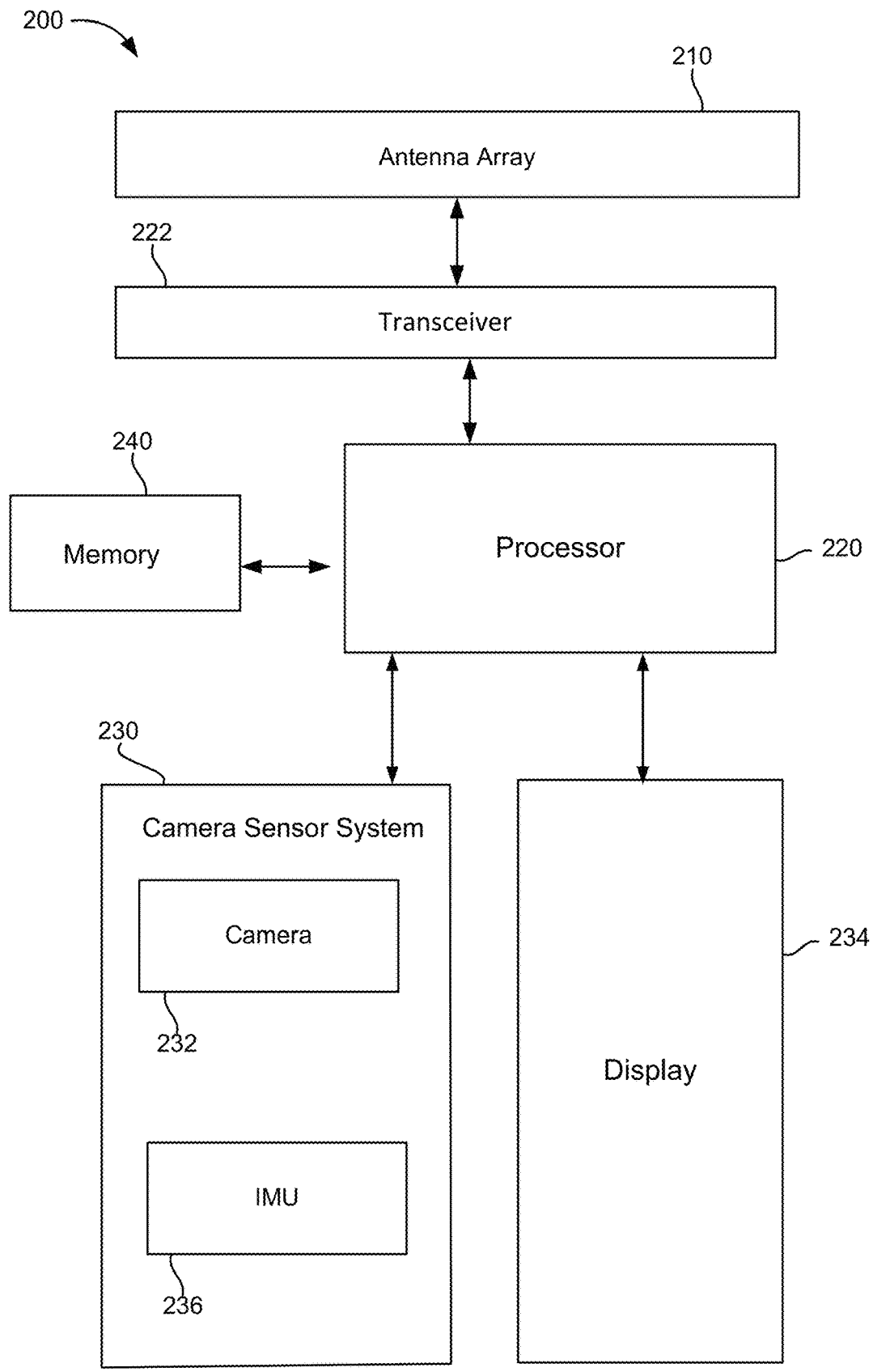
FIG. 2 illustrates an exemplary mobile device according to at least one aspect of the disclosure.

With reference to FIG. 2, a simplified schematic of an exemplary mobile device 200 with processor 220, antenna array 210, transceiver 222, camera sensor system 230 and display 234 is illustrated. In an aspect, mobile device 200 may employ AR/XR technology to display AR/XR virtual objects and renderings on display 234. Mobile device 200 further comprises memory 240. Camera sensor system 230 includes camera 232 and inertial measurement unit (IMU) 236. In an aspect, IMU 236 may include a gyroscope, an accelerometer, a magnetometer and/or other sensors that are necessary to measure and detect the movement of mobile device 200. Camera sensor system 230 may further include other sensors (not shown) such as one or more of a lidar sensor, a radar sensor, a velocity sensor and/or any other sensor that may aid in the operation of mobile device 200. It will be noted that mobile device 200 may be similar to UE 104, 190 or any other UEs shown in FIG. 1 and may further comprise one or more components as known to one skilled in the art, but which are not illustrated in FIG. 2.

Figure 4:
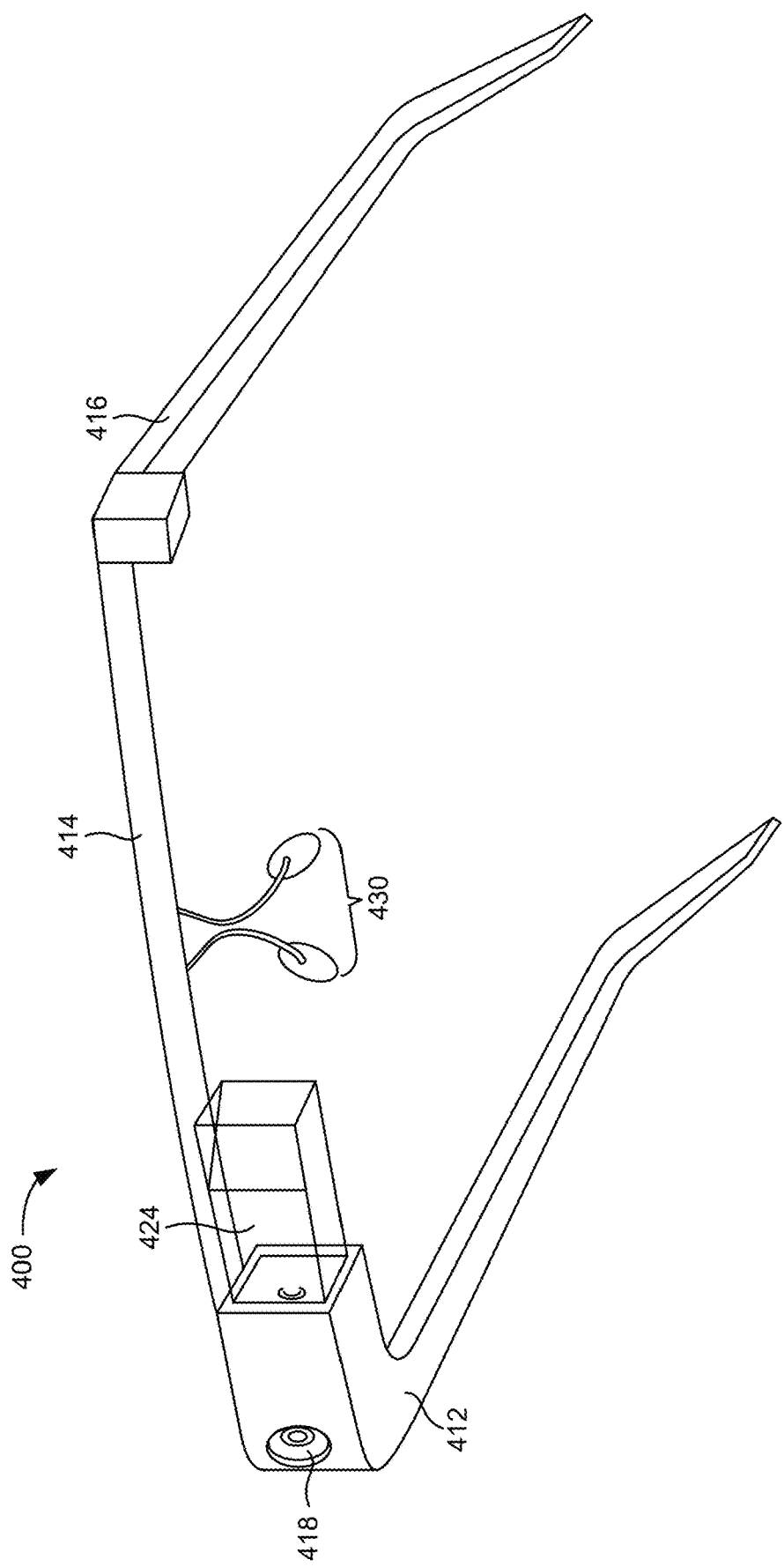
FIG. 4 illustrates an exemplary implementation of a mobile device in a form of smart glasses according to at least one aspect of the disclosure.

Mobile device 200 may be any suitable electronic device that is mobile. For example, mobile device 200 may be a smartphone, a tablet, a laptop, a smartwatch, a shipment tracking device, a wearable, smart glasses, an onboard computer installed on a vehicle or the like. For example, in an aspect, mobile device 200 may take a form of smart glasses such as smart glasses 400 shown in FIG. 4. As shown in FIG. 4, smart glasses 400 comprises frames portions 414, 416 and 412, camera 418, display 424 and nose piece 430.

In an aspect, camera 418 may be similar to camera 232, and display 424 may be similar to display 234. Furthermore, in an aspect, other components similar to processor 220, antenna array 210 and transceiver 222 may be hidden inside frame portion 412 or any other frame portion.

Antenna array 210 includes multiple antennas for transmit and receive beamforming as explained above. Antenna array 210 is coupled to transceiver 222. Processor 220 may control antenna array 210 and transceiver 222. Transceiver 222 may include a wireless wide area network (WWAN) transceiver providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceiver may be connected to one or more antennas in the antenna array 210 for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). Transceiver 222 may further include a wireless local area network (WLAN) transceiver. The WLAN transceiver may be connected to one or more antennas in antenna array 210 and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest.

In addition, transceiver 222 may include satellite positioning systems (SPS) receivers. The SPS receivers may be connected to one or more antennas in antenna array 210, respectively, and may provide means for receiving and/or measuring SPS signals, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers may comprise any suitable hardware and/or software for receiving and processing SPS signals.

Transceiver circuitry in transceiver 222 including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas such as antenna array 210, that permits the respective apparatus to perform transmit "beamforming," as described herein. Similarly, a receiver may include or be coupled to a plurality of antennas such as antenna array 210, that permits the respective apparatus to perform receive beamforming, as described herein. In an aspect, the transmitter and receiver may share the same plurality of antennas (e.g., antenna array 210), such that the respective apparatus can only receive or transmit at a given time, not both at the same time.

As shown in FIG. 2, processor 220 is coupled to transceiver 222. Processor 220 is also coupled to memory 240 and camera sensor system 230 as shown in FIG. 2. Camera sensor system 230 includes camera 232 and IMU 236. Camera sensor system 230 detects and measures its respective environment and transmits the measurement as a data to processor 220. IMU 236 may measure the movement of mobile device 200 including the movement in the three-dimensional (3D) coordinate system and the rotational movement. In an aspect, processor 220 may control the operation of camera sensor system 230. In addition, processor 220 is coupled to display 234 and may display objects and renderings including virtual objects and virtual renderings on display 234. As used herein, it will be appreciated that the term real object refers to visual measurement of an actual scene and objects in front of the AR/XR device observed through camera lens. The real object is unaltered in comparison with direct observation from perceived by human eyes. Virtual objects and virtual renderings refer to displayed content that is only visible through the AR/XR device. Virtual object/rendering is a result of a rendering algorithm, instead of direct optical measurement and may contain aspects of the real object or be entirely computer generated via the rendering algorithm.

In an aspect, processor 220 may control camera 232 and IMU 236 in camera sensor system 230 and receive data from camera 232 and IMU 236. Camera 232 and IMU 236 may provide its respective data to processor 220 as directed by processor 220. Camera 232 may provide the images of the environment surrounding mobile device 200 to processor 220, and processor 220 may analyze the images from camera 232 to determine different objects in the images. IMU 236 may measure the movement and the orientation of mobile device 200 including the rotational movement and the movement in the three-dimensional (e.g., x, y, z) coordinate system. IMU 236 may also measure the velocity of the movement of mobile device 200. For example, the IMU measures the angular rate and acceleration, which can be used to compute a change of the pose of device. IMU 236 may transmit the measured data to processor 220.

Processor 220 may use the data received from the IMU 236 to determine the positional information of mobile device 200 including at least one of the orientation, translation or motion of mobile device 200. The positional information may include the angles and movements of mobile device 200 in multiple axes as processed by processor 220 based on the data detected by IMU 236.

Processor 220 may use such algorithms as rotation vector algorithms to determine the positional information of mobile device 200. Such algorithms may be stored in memory 240 and processed by processor 220. For example, the processor 220 may use a combination of data from the IMU 236 to compute the positions of mobile device 200 in 2D and/or 3D coordinate systems.

Processor 220 may combine the image data from camera 232 and the determined positional information of mobile device 200 to display virtual objects and virtual renderings on display 234. For example, assuming that mobile device 200 takes the form of smart glasses 400 shown in FIG. 4, processor 220 may receive images captured by camera 418 on smart glasses 400. In this example, camera 418 may capture image 500 of a bedroom shown in FIG. 5A and transmit image 500 to processor 220. Based on the received image 500, processor 220 may analyze image 500 and determine the real objects in image 500 such as clock 520, nightstand 510 and bed 540. Based on the determined real objects in image 500, processor 220 may display a virtual object such as bottle 530 shown in FIG. 5A on display 424. To display bottle 530 correctly on nightstand 510, processor 220 may need to calculate the proper x-coordinate 532, y-coordinate 531 and z-coordinate 533 of bottle 530 based on image 500 and the data received from the IMU 236. The correct positioning and/or posture of bottle 530 on display 424 depends on the movement of smart glasses 400 (i.e., depends on the movement of the user of smart glasses 400), and processor 220 may analyze the data from the IMU 236 including the orientation, movement and velocity of smart glasses 400 to determine the proper coordinates to position and display bottle 530.

Figure 5A:
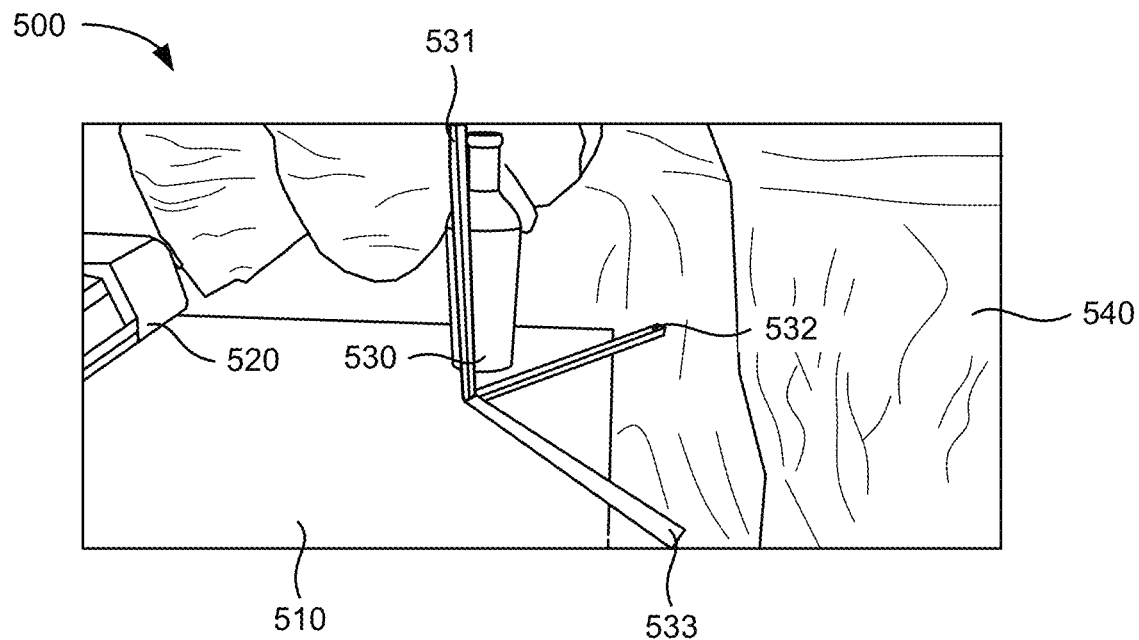
FIG. 5A illustrates the positioning of a virtual object on a display according to at least one aspect of the disclosure.
Figure 5B:
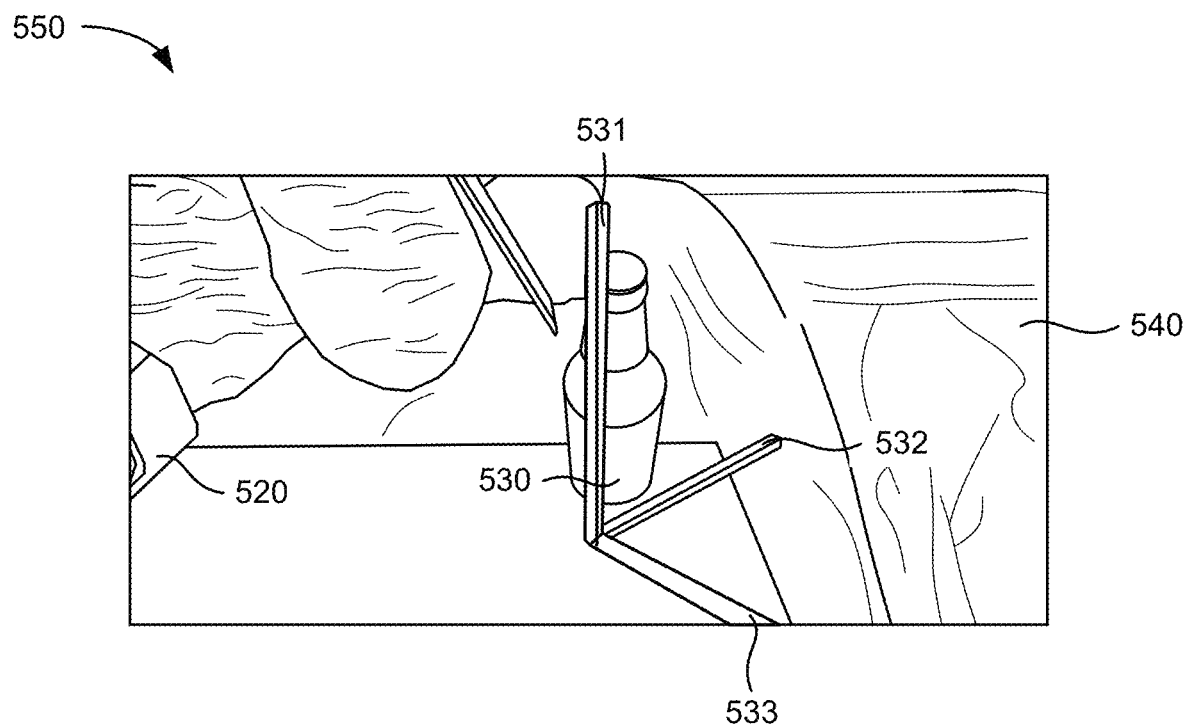
FIG. 5B illustrates the positioning of a virtual object on a display according to at least one aspect of the disclosure.

However, if smart glasses 400 moves (i.e., the user of smart glasses 400 moves while using smart glasses 400), camera 418 may transmit a new image such as image 550 shown in FIG. 5B to processor 220. Since smart glasses 400 is moving, IMU 236 may transmit new data reflecting the movement to processor 220. Based on image 550 and the new data from the IMU 236, processor 220 may determine the new proper x-coordinate 532, y-coordinate 531 and z-coordinate 533 of bottle 530 as shown in FIG. 5B. After determining the new coordinates, processor 220 may display bottle 530 based on the new coordinates as shown in FIG. 5B.

One issue with AR/XR technology is that unauthorized entities may gain unauthorized access into an AR/XR device and insert unauthorized content into the display of the device to cause problems. In an aspect, mobile device 200 detects and prevents such hacking by monitoring the virtual objects and renderings that are shown on display 234. Based on an image received from camera 232, processor 220 may analyze the image to determine which of the objects and renderings shown on display 234 is a real object or a virtual object and rendering. By comparing the image received from camera 232 with what is displayed on display 234, processor 220 may determine which objects are real or virtual and find virtual objects. Processor 220 may monitor the displayed virtual objects and renderings by comparing the positioning and/or posture of the virtual objects and renderings with the data from the IMU 236. In other words, processor 220 may determine whether the positioning and/or posture of virtual objects and renderings align or correlate with the data received from the IMU 236. If an unauthorized entity that hacked into mobile device 200 does not have access to the data from the IMU 236, the virtual objects inserted by the unauthorized entity may not correlate or align correctly with the data from the IMU 236.

In an aspect, when smart glasses 400 moves, processor 220 may determine the change in the pose of smart glasses 400 based on the data from the IMU 236 where the data includes the orientation and translation data. The data from the IMU 236 may be used to estimate the new position or coordinates of a virtual object that was displayed on display 234. The estimated new position/coordinates indicates the position where the virtual object should be placed on display 234 based on the data from the IMU 236. In an aspect, processor 220 may estimate the new position/coordinates by projecting the previous coordinates of the virtual object to the current visual frame seen by smart glasses 400 by using the data from the IMU 236. In addition, processor 220 may determine the actual position/coordinates of the virtual object in the current visual frame of display 234. Processor 220 may compare the estimated new position/coordinates to the actual determined position/coordinates of the virtual object to determine the difference between the estimated new position/coordinates and the actual determined position/coordinates. If the difference between the estimated new position/coordinates and the actual determined position/coordinates is above a certain threshold (e.g., exceeds a distance difference threshold), processor 220 may determine that the virtual object is an unauthorized virtual object. For example, in some aspects, the distance difference is calculated between the predicted object (or key point on an object) location and camera measured location. In some aspects, the distance difference threshold can be on the order of a few millimeters (mm). However, it will be appreciated that larger distance difference threshold can be used to reduce false alarms. Generally, small distance difference threshold increase security, while larger distance difference threshold reduce false alarms/false detection of an unauthorized virtual object. Additionally, the threshold may be related to the actual detection algorithm, size of the virtual object, size of the image (e.g., real dimensions of the captured image), the motion of the AR/XR device, etc. Accordingly, it will be appreciated that the various aspects are not limited to foregoing examples and one skilled in the art will appreciate the design implications and tradeoffs in establishing various thresholds for detecting unauthorized virtual objects.

Referring back to the examples in FIGS. 5A and 5B, if an unauthorized entity inserted bottle 530 into image 500 and did not have access to the data from the IMU 236, then the positioning and/or posture of bottle 530 would not adjust properly when the user of smart glasses 400 moves smart glasses 400. For example, images 500 and 550 show that smart glasses 400 moved towards bed 540 between the time images 500 and 550 were taken. Bottle 530 shown in FIG. 5B shows proper positioning and posture based on the data from the IMU 236. However, if the unauthorized entity did not have access to the data from the IMU 236, the positioning and posture of bottle 530 in image 550 would appear the same as the positioning and posture shown in image 500.

Figure 5C:
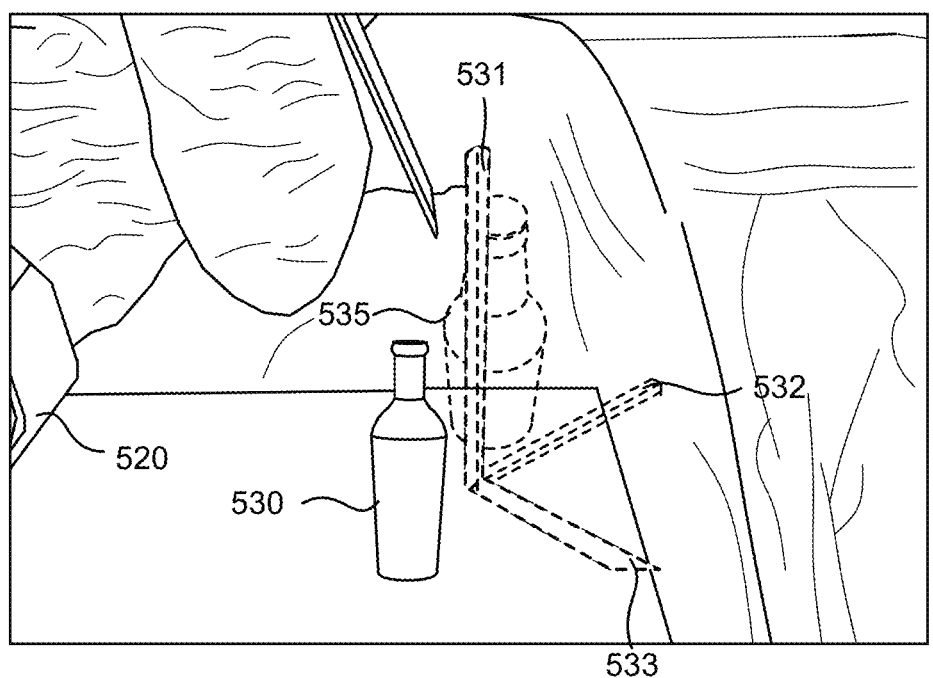
FIG. 5C illustrates the positioning of a virtual object on a display according to at least one aspect of the disclosure.

In FIG. 5C, image 570 shows bottle 530 that has not been properly adjusted based on the movement of smart glasses 400 unlike image 550 since the unauthorized entity does not have access to the data from the IMU 236. Instead of showing proper position and posture as in image 550, bottle 530 in image 570 is offset from the estimated new position 535 of the virtual object and does not show the proper adjusted position and posture of bottle 530 when smart glasses 400 moved closer to bed 540. Thus, if the unauthorized entity does not have access to the data from the IMU 236, the unauthorized entity is not able to properly adjust the positioning and posture of virtual objects that the unauthorized entity has inserted into display 234 when mobile device 200 makes a movement. It will be appreciated that there will a difference between the estimated new position 535 and the actual position of the virtual object (bottle 530). The difference may be determined as distance, a posture (e.g., tilt, orientation, etc.), a time difference (e.g., delay in responding to the movement), and may be determined from one or more points of the virtual object (bottle 530) relative to the estimated new position 535 of the virtual object (bottle 530) in a 3D space (e.g., the proper x-coordinate 532, y-coordinate 531 and z-coordinate 533) as illustrated. Therefore, processor 220 may monitor all of the virtual objects and renderings shown on display 234 to determine whether the positioning and posture of virtual objects and renderings correlate or align with the data from the IMU 236. In an aspect, if the position and/or posture of any of the displayed virtual objects do not correlate or align with the data received from the IMU 236, processor 220 may determine that the virtual object with improper uncorrelated positioning and/or posture may have been inserted into display 234 by an unauthorized entity without proper authorization. Through this process, processor 220 may find any improperly inserted virtual objects that were inserted without authorization.

In an aspect, if an unauthorized entity who inserted an unauthorized virtual object has access to the data from the IMU 236, processor 220 may still detect the unauthorized virtual object based on the latency and delay occurring when the unauthorized virtual object is repositioned based on the data received from the IMU 236. For example, an unauthorized entity may try to reposition the unauthorized virtual object based on the data from the IMU 236, but the unauthorized entity will likely face a delay in obtaining the data from the IMU 236 because it is very likely the unauthorized entity is far from mobile device 200 and the data may need to travel through many different gateways to arrive at the unauthorized entity's computer whereas an authorized app positioning a virtual object will likely received data from the IMU 236 relatively quickly from the IMU 236. Since the unauthorized entity faces a delay in obtaining the data from the IMU 236, the repositioning of the unauthorized virtual object will be delayed even though the repositioning is based on the data from the IMU 236. In this case, if the delay or the latency is greater than a certain threshold, processor 220 may determine that the virtual object in question is an unauthorized virtual object that may have been improperly inserted by an unauthorized entity. Processor 220 may determine the delay threshold based on various factors such as the environment and the apps running on smart glasses 400 or mobile device 200. Thus, in an aspect, processor 220 monitors all of the virtual objects and renderings on display 234 and detects for virtual objects and renderings that show delays and latencies while they are repositioned based on the data from the IMU 236. In an aspect, if any of the virtual object and rendering exhibits a delay longer than a threshold while being repositioned based on the data from the IMU 236, processor 220 may determine that the virtual object or rendering exhibiting the delay may be an improperly inserted virtual object. Through this process, processor 220 may find any improperly inserted virtual objects and renderings. In some aspects the delay threshold may be on in the range of 10 ms to 100 ms. Similar to the distance delay discussed in the foregoing, it will be appreciated that in general there is a tradeoff regarding a lower delay threshold and higher security versus the higher the probability of false alarms/unauthorized virtual object detection.

In an aspect, mobile device 200 may have apps running on mobile device 200 that render virtual objects on display 234. Virtual objects rendered by apps running on mobile device 200 may be monitored and checked by processor 220 as described above. An app may bypass the above described monitoring and security features if the app has permission from the user of the app to bypass the above described monitoring of any rendered virtual objects. In an app that have multiple users, the app may request permission from one or more users before bypassing the above monitoring of virtual objects.

In an aspect, when processor 220 detects unauthorized objects and renderings, processor 220 may take different types of actions to tighten the security of mobile device 200 and prevent further hacking. The following lists some of the possible actions that the processor 220 may take to tighten the security of mobile device 200 and prevent further hacking:

Generate a warning icon/message to the user of mobile device 200. The user can decide on what actions to take.

In certain critical applications, processor 220 may send an emergency notification to critical people such as the police, personal contacts, security guards, etc.

The connectivity of mobile device 200 can be terminated if mobile device 200 is using a public network (e.g. hotspot, public WiFi etc.).

Specific content or application that may have led to the hacking activity may be flagged by processor 220.

A request for re-authentication from the user may be initiated by processor 220 (in the case of false alarm).

After detecting unauthorized virtual object and/or warning the user about the possible malware or security breach, processor 220 may identify and categorize a risk level of any unauthorized virtual object such as low risk or high risk unauthorized virtual object. For example, a low risk unauthorized virtual object may be an unauthorized advertisement, but a high risk unauthorized virtual object may be an unauthorized traffic sign. In some aspects, a differentiator for low/high risk content can be based on whether the content will alter how the user will take action back in the real world. For example, if a user is sitting watching some content but not interacting with the content or the user's surroundings and one or more unauthorized advertisements show up in the display. It is likely that the user realize it's an advertisement and it is likely that nothing or nothing dangerous would be expected to happen afterwards, then the risk level should be a categorized as low risk. However, in a similar scenario, if instead of showing an advertisement, fire or smoke is displayed, it is likely that this will increase the stress of the user out of concerned there is a real emergency and something is burning. Further, it will likely cause the user to take actions, such as triggering a fire alarm, etc. that would be inappropriate and may increase the risk to others. This type of unauthorized virtual object is classified as a high risk level. Accordingly, some aspects include identifying the unauthorized virtual object and determining the risk level as low risk when the unauthorized virtual object is unlikely to alter a user action or determining the risk level as high risk when the unauthorized virtual object is likely to alter a user action.

It will be appreciated that various systems/algorithms/techniques can be used for detecting/identifying/recognizing/classifying the virtual objects in the captured images. Deformable Parts Models (DPM) systems/algorithms use a sliding window approach where the classifier is run at evenly spaced locations over the entire image. Region-Based Convolutional Neural Networks (R-CNNs) systems/algorithms generate potential bounding boxes in an image and then run a classifier on these proposed boxes for object localization and recognition and You Only Look Once (YOLO) systems/algorithms perform object detection as a regression from image pixels to bounding box coordinates and class probabilities. It will be appreciated that the various aspects are not limited to the forgoing examples and other know systems/algorithms/techniques for object detection/recognition/identification/classification may be used.

In some aspects, the risk level may be determined by at least one of a user's characteristic or a user's context. For example, the user's characteristics may include aspects such as age, mental capacity, other at risk characteristics, etc. In some aspects, certain user characteristics may cause the risk level to be determined to be high risk for any unauthorized virtual object, for example, for users below a certain age, above a certain age, with limited mental capacity, low visual perception and any other characteristic that may cause adverse user reactions. Further, the user's context may also cause the risk level to be determined to be high risk for any unauthorized virtual object. For example, if the user is in a training session, important meeting, etc., any unauthorized virtual object may be flagged as high risk as the disruption and/or potential for improper training/information being supplied are deemed unacceptable. It will be appreciated that the characteristics/context information may be gathered using any suitable technique. For example, in some aspects, the information can be manually entered by user like the age, health risk, etc. and approved for us in the detector through user agreement. In some aspects, the information can be computed by another context awareness algorithm (e.g., computing you are driving based on motion classifier, understanding you are in a conference based on audio speech profiles, etc.). Further, while the foregoing discussed risk level as low risk or high risk, it will be appreciated that additional risk levels may be defined based on the various aspects and/or combinations of the foregoing examples. Accordingly, it will be appreciated from the foregoing that the various aspects disclosed herein are not limited to the specific examples provided herein.

In some aspects, the display function may incorporate multiple security levels. Mobile device 200 may operate under the normal and/or medium security under normal circumstances, but if any unauthorized virtual object/hacking is detected by processor 220, processor 220 may increase the security level. It will be appreciated that the actions that can be taken by mobile device 200 to prevent further hacking are not limited to the various examples provided herein. Mobile device 200 may take any other actions to stop the current hacking and prevent any future hacking, as will be appreciated by those skilled in the art.

The components of FIG. 2 may be implemented in various ways. In some implementations, the components of FIG. 2 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 210 to 240 may be implemented by processor and memory component(s) of the mobile device 200 (e.g., by execution of appropriate code and/or by appropriate configuration of processor components). However, as will be appreciated, such operations, acts, and/or functions may actually be performed by specific components or combinations of components of mobile device 200, such as antenna array 210, transceiver 222, processor 220, camera sensor system 230, display 234 and memory 240. Further, it will be appreciated that some of the functionalities disclosed herein may be distributed to one or more additional devices. For example, the mobile device 200 (e.g., smart glasses, UE, etc.) may provide data to one or more other devices that may perform at least a portion of the processing to reduce power consumption and/or improve performance. For example, the mobile device 200 (e.g., smart glasses, UE, etc.) may communicate data with another mobile device, desktop device, one or more servers in a core network and/or on the Internet (using communication systems disclosed herein and known in the art), or combinations thereof.

Figure 3A:
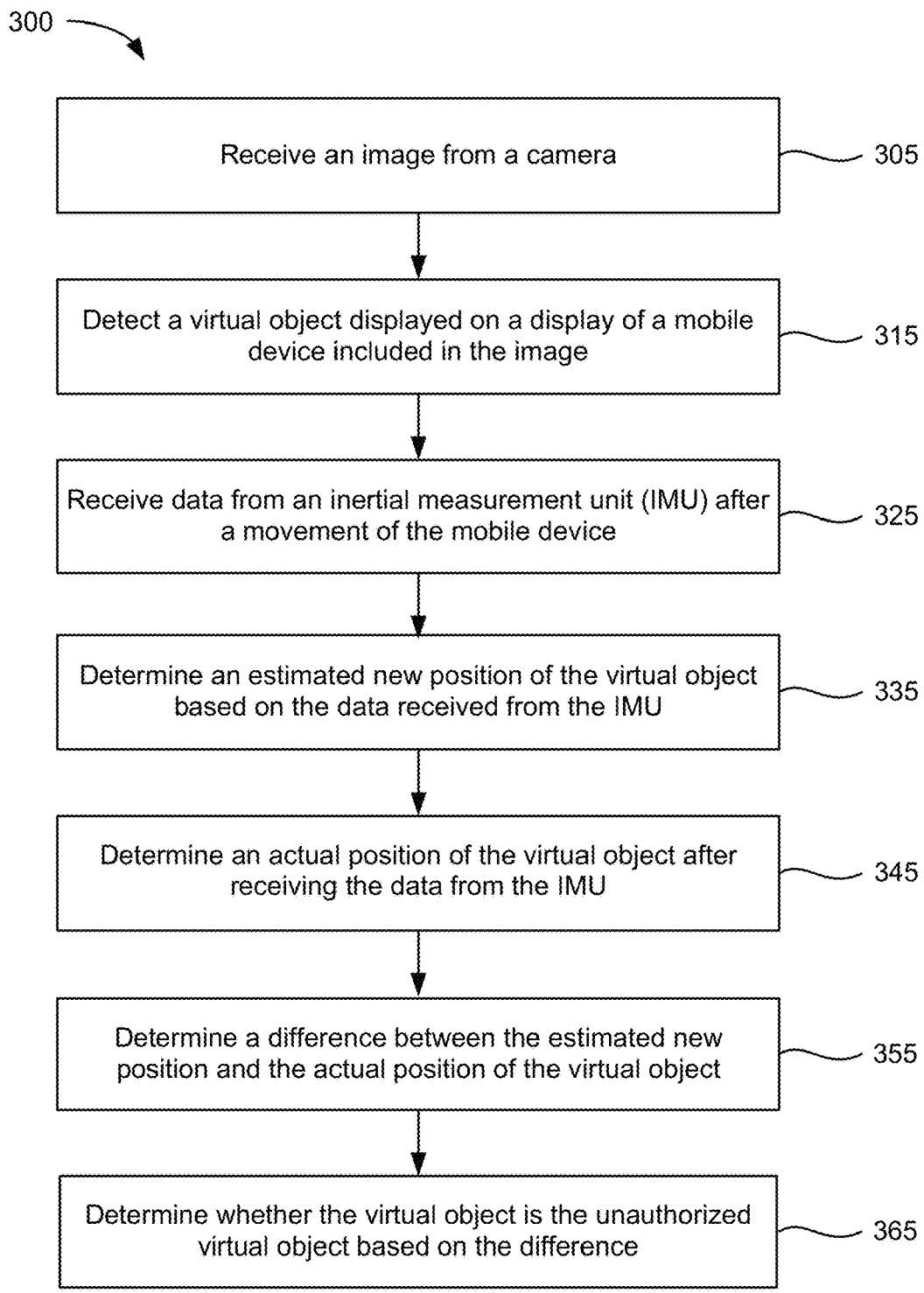
FIG. 3A illustrates a flowchart corresponding to one or more methods of detecting an unauthorized virtual object according to at least one aspect of the disclosure.
Figure 3B:
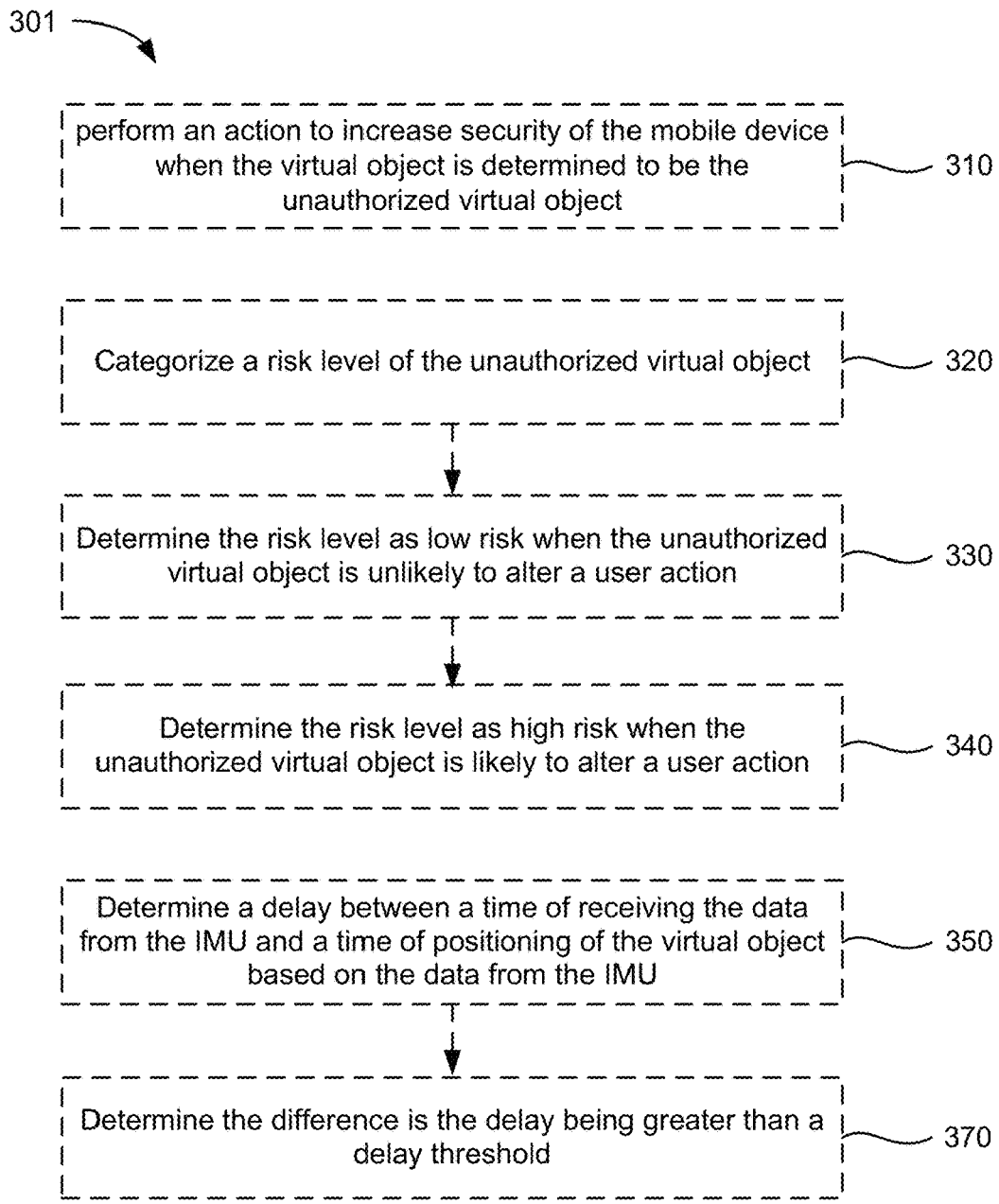
FIG. 3B illustrates a flowchart corresponding to one or more methods of detecting an unauthorized virtual object, according to at least one aspect of the disclosure.

It will be appreciated that aspects include various methods for performing the processes, functions and/or algorithms disclosed herein. For example, FIGS. 3A and 3B illustrate methods 300 and 301, respectively, for detecting an unauthorized virtual object in a mobile device. The methods may be performed by a device such as mobile device 200, processor 220, UEs 104, 190 or other UEs shown in FIG. 1. In some aspects, the method methods 300 and 301 described in FIGS. 3A and 3B may be performed by smart glasses 400 shown in FIG. 4.

Referring to FIG. 3A, at block 305, the method 300 receives an image from a camera. Processor 220 may receive an image taken by camera 232.

At block 315, the method 300 detects a virtual object displayed on a display of a mobile device included in the image. Processor 220 may analyze the image to determine which of the objects displayed on display 234 is a real object or a virtual object and find the virtual object by comparing the image from the camera to the image displayed on the display, using systems/algorithms/techniques, as discussed herein.

At block 325, the method 300 receives data from an inertial measurement unit (IMU) after a movement of the mobile device. Processor 220 may detect a movement of the mobile device 200 by using IMU 236.

At block 335, the method 300 determines an estimated new position of the virtual object based on the data received from the IMU. Processor 220 may estimate the new position of the virtual object based on the data received from the IMU 236.

At block 345, the method determines the actual position of the virtual object after receiving the data from the IMU. Processor 220 may determine the actual position of the virtual object as displayed on display 234 after receiving the data from the IMU 236.

At block 355, the method 300 determines a difference between the estimated new position and the actual position of the virtual object. Processor 220 may determine the difference between the estimated new position and the actual position of the virtual object.

At block 365, the method determines the virtual object is the unauthorized virtual object based on the difference. Processor 220 may determine the virtual object to be the unauthorized virtual object based on the difference which may be determined as distance, a posture (e.g., tilt, orientation, etc.), a time difference (e.g., delay in responding to the movement), and may be determined from one or more points of the virtual object relative to the estimated new position of the virtual object in a 3D space, as discussed herein.

Referring to FIG. 3B, various optional methods 301 are illustrated. In some aspects, one or more may be combined with method 300 discussed above. For example, at block 310, the method performs an action to increase security of the mobile device when the virtual object is determined to be the unauthorized virtual object. In some aspects, the action may include at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

At block 320, the method 301 may optionally categorize a risk level of the unauthorized virtual object. At block 330, the risk level may be determined as low risk when the unauthorized virtual object is unlikely to alter a user action. At block 340, the risk level may be determined as high risk when the unauthorized virtual object is likely to alter a user action.

At block 350, the method 301 may optionally determine a delay between a time of receiving the data from the IMU and a time of positioning of the virtual object based on the data from the IMU. At block 370, the method 301 in determining whether the virtual object is the unauthorized virtual object based on the difference (from block 365) may determine the difference is the delay being greater than a delay threshold.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of detecting an unauthorized virtual object, the method comprising: receiving an image from a camera; detecting a virtual object displayed on a display of a mobile device included in the image; receiving data from an inertial measurement unit (IMU) after a movement of the mobile device; determining an estimated new position of the virtual object based on the data received from the IMU; determining an actual position of the virtual object after receiving the data from the IMU; determining a difference between the estimated new position and the actual position of the virtual object; and determining whether the virtual object is the unauthorized virtual object based on the difference.

Clause 2. The method of clause 1, wherein the difference is a distance that exceeds a distance difference threshold.

Clause 3. The method of any of clauses 1 to 2, further comprising: determining a delay between a time of receiving the data from the IMU and a time of positioning of the virtual object based on the data from the IMU.

Clause 4. The method of clause 3, wherein the virtual object is determined as the unauthorized virtual object when the difference is the delay being greater than a delay threshold.

Clause 5. The method of any of clauses 1 to 4, further comprising: performing an action to increase security of the mobile device when the virtual object is determined to be the unauthorized virtual object.

Clause 6. The method of clause 5, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

Clause 7. The method of any of clauses 1 to 6, further comprising: categorizing a risk level of the unauthorized virtual object.

Clause 8. The method of clause 7, further comprising: identifying the unauthorized virtual object.

Clause 9. The method of clause 8, further comprising: determining the risk level as low risk when the unauthorized virtual object is unlikely to alter a user action; and determining the risk level as high risk when the unauthorized virtual object is likely to alter a user action.

Clause 10. The method of any of clauses 7 to 9, wherein the risk level of the unauthorized virtual object is based on at least one of a user's characteristic or a user's context.

Clause 11. The method of any of clauses 1 to 10, wherein detecting the virtual object further comprises: comparing the image from the camera to an image displayed on the display.

Clause 12. The method of any of clauses 1 to 11, wherein the unauthorized virtual object is a virtual object inserted by an unauthorized entity.

Clause 13. A mobile device configured to detect an unauthorized virtual object, comprising: a memory; and at least one processor communicatively coupled to the memory, the at least one processor configured to: receive an image from a camera; detect a virtual object displayed on a display of a mobile device included in the image; receive data from an inertial measurement unit (IMU) after a movement of the mobile device; determine an estimated new position of the virtual object based on the data received from the IMU; determine an actual position of the virtual object after receiving the data from the IMU; determine a difference between the estimated new position and the actual position of the virtual object; and determine whether the virtual object is the unauthorized virtual object based on the difference.

Clause 14. The mobile device of clause 13, wherein the difference is a distance that exceeds a distance difference threshold.

Clause 15. The mobile device of any of clauses 13 to 14, wherein the at least one processor is further configured to: determine a delay between a time of receiving the data from the IMU and a time of positioning of the virtual object based on the data from the IMU.

Clause 16. The mobile device of clause 15, wherein the virtual object is determined as the unauthorized virtual object when the difference is the delay being greater than a delay threshold.

Clause 17. The mobile device of any of clauses 13 to 16, wherein the at least one processor is further configured to: perform an action to increase security of the mobile device when the virtual object is determined to be the unauthorized virtual object.

Clause 18. The mobile device of clause 17, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

Clause 19. The mobile device of any of clauses 13 to 18, wherein the at least one processor is further configured to: categorize a risk level of the unauthorized virtual object.

Clause 20. The mobile device of clause 19, wherein the at least one processor is further configured to: identify the unauthorized virtual object.

Clause 21. The mobile device of clause 20, wherein the at least one processor is further configured to: determine the risk level as low risk when the unauthorized virtual object is unlikely to alter a user action; and determine the risk level as high risk when the unauthorized virtual object is likely to alter a user action.

Clause 22. The mobile device of any of clauses 19 to 21, wherein the risk level of the unauthorized virtual object is based on at least one of a user's characteristic or a user's context.

Clause 23. The mobile device of any of clauses 13 to 22, wherein the at least one processor configured to detect the virtual object comprises the at least one processor configured to: compare the image from the camera to an image displayed on the display.

Clause 24. The mobile device of any of clauses 13 to 23, wherein the unauthorized virtual object is a virtual object inserted by an unauthorized entity.

Clause 25. A mobile device configured to detect an unauthorized virtual object, comprising: means for receiving an image from a camera; means for detecting a virtual object displayed on a display of a mobile device included in the image; means for receiving data from an inertial measurement unit (IMU) after a movement of the mobile device; means for determining an estimated new position of the virtual object based on the data received from the IMU; means for determining an actual position of the virtual object after receiving the data from the IMU; means for determining a difference between the estimated new position and the actual position of the virtual object; and means for determining whether the virtual object is the unauthorized virtual object based on the difference.

Clause 26. The mobile device of clause 25, wherein the difference is a distance that exceeds a distance difference threshold.

Clause 27. The mobile device of any of clauses 25 to 26, further comprising: means for determining a delay between a time of receiving the data from the IMU and a time of positioning of the virtual object based on the data from the IMU.

Clause 28. The mobile device of clause 27, wherein the virtual object is determined as the unauthorized virtual object when the difference is the delay being greater than a delay threshold.

Clause 29. The mobile device of any of clauses 25 to 28, further comprising: means for performing an action to increase security of the mobile device when the virtual object is determined to be the unauthorized virtual object.

Clause 30. The mobile device of clause 29, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

Clause 31. The mobile device of any of clauses 25 to 30, further comprising: means for categorizing a risk level of the unauthorized virtual object.

Clause 32. The mobile device of clause 31, further comprising: means for identifying the unauthorized virtual object.

Clause 33. The mobile device of clause 32, further comprising: means for determining the risk level as low risk when the unauthorized virtual object is unlikely to alter a user action; and means for determining the risk level as high risk when the unauthorized virtual object is likely to alter a user action.

Clause 34. The mobile device of any of clauses 31 to 33, wherein the risk level of the unauthorized virtual object is based on at least one of a user's characteristic or a user's context.

Clause 35. The mobile device of any of clauses 25 to 34, wherein the means for detecting the virtual object further comprises: means for comparing the image from the camera to an image displayed on the display.

Clause 36. The mobile device of any of clauses 25 to 35, wherein the unauthorized virtual object is a virtual object inserted by an unauthorized entity.

Clause 37. A non-transitory computer-readable medium storing computer-executable instructions that, when executed by a mobile device configured to detect an unauthorized virtual object, cause the mobile device to: receive an image from a camera; detect a virtual object displayed on a display of a mobile device included in the image; receive data from an inertial measurement unit (IMU) after a movement of the mobile device; determine an estimated new position of the virtual object based on the data received from the IMU; determine an actual position of the virtual object after receiving the data from the IMU; determine a difference between the estimated new position and the actual position of the virtual object; and determine whether the virtual object is the unauthorized virtual object based on the difference.

Clause 38. The non-transitory computer-readable medium of clause 37, wherein the difference is a distance that exceeds a distance difference threshold.

Clause 39. The non-transitory computer-readable medium of any of clauses 37 to 38, further comprising computer-executable instructions that, when executed by the mobile device, cause the mobile device to: determine a delay between a time of receiving the data from the IMU and a time of positioning of the virtual object based on the data from the IMU.

Clause 40. The non-transitory computer-readable medium of clause 39, wherein the virtual object is determined as the unauthorized virtual object when the difference is the delay being greater than a delay threshold.

Clause 41. The non-transitory computer-readable medium of any of clauses 37 to 40, further comprising computer-executable instructions that, when executed by the mobile device, cause the mobile device to: perform an action to increase security of the mobile device when the virtual object is determined to be the unauthorized virtual object.

Clause 42. The non-transitory computer-readable medium of clause 41, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

Clause 43. The non-transitory computer-readable medium of any of clauses 37 to 42, further comprising computer-executable instructions that, when executed by the mobile device, cause the mobile device to: categorize a risk level of the unauthorized virtual object.

Clause 44. The non-transitory computer-readable medium of clause 43, further comprising computer-executable instructions that, when executed by the mobile device, cause the mobile device to: identify the unauthorized virtual object.

Clause 45. The non-transitory computer-readable medium of clause 44, further comprising computer-executable instructions that, when executed by the mobile device, cause the mobile device to: determine the risk level as low risk when the unauthorized virtual object is unlikely to alter a user action; and determine the risk level as high risk when the unauthorized virtual object is likely to alter a user action.

Clause 46. The non-transitory computer-readable medium of any of clauses 43 to 45, wherein the risk level of the unauthorized virtual object is based on at least one of a user's characteristic or a user's context.

Clause 47. The non-transitory computer-readable medium of any of clauses 37 to 46, wherein the computer-executable instructions that, when executed by the mobile device, cause the mobile device to detect the virtual object comprise computer-executable instructions that, when executed by the mobile device, cause the mobile device to: compare the image from the camera to an image displayed on the display.

Clause 48. The non-transitory computer-readable medium of any of clauses 37 to 47, wherein the unauthorized virtual object is a virtual object inserted by an unauthorized entity.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of detecting an unauthorized virtual object, the method comprising:
    receiving an image from a camera;
    detecting a virtual object displayed on a display of a mobile device included in the image;
    receiving data from an inertial measurement unit (IMU) after a movement of the mobile device;
    determining an estimated new position of the virtual object based on the data received from the IMU;
    determining an actual position of the virtual object after receiving the data from the IMU;
    determining a difference between the estimated new position and the actual position of the virtual object; and
    determining whether the virtual object is the unauthorized virtual object based on the difference.

2. The method of claim 1, wherein the difference is a distance that exceeds a distance difference threshold.

3. The method of claim 1, further comprising:
    determining a delay between a time of receiving the data from the IMU and a time of positioning of the virtual object based on the data from the IMU.

4. The method of claim 3, wherein the virtual object is determined as the unauthorized virtual object when the difference is the delay being greater than a delay threshold.

5. The method of claim 1, further comprising:
    performing an action to increase security of the mobile device when the virtual object is determined to be the unauthorized virtual object.

6. The method of claim 5, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

7. The method of claim 1, further comprising:
    categorizing a risk level of the unauthorized virtual object.

8. The method of claim 7, further comprising:
    identifying the unauthorized virtual object.

9. The method of claim 8, further comprising:
    determining the risk level as low risk when the unauthorized virtual object is unlikely to alter a user action; and
    determining the risk level as high risk when the unauthorized virtual object is likely to alter a user action.

10. The method of claim 7, wherein the risk level of the unauthorized virtual object is based on at least one of a user's characteristic or a user's context.

11. The method of claim 1, wherein detecting the virtual object further comprises:
    comparing the image from the camera to an image displayed on the display.

12. The method of claim 1, wherein the unauthorized virtual object is a virtual object inserted by an unauthorized entity.

13. A mobile device configured to detect an unauthorized virtual object, comprising:
    a memory; and
    at least one processor communicatively coupled to the memory, the at least one processor configured to:
        receive an image from a camera;
        detect a virtual object displayed on a display of a mobile device included in the image;
        receive data from an inertial measurement unit (IMU) after a movement of the mobile device;
        determine an estimated new position of the virtual object based on the data received from the IMU;
        determine an actual position of the virtual object after receiving the data from the IMU;
        determine a difference between the estimated new position and the actual position of the virtual object; and
        determine whether the virtual object is the unauthorized virtual object based on the difference.

14. The mobile device of claim 13, wherein the difference is a distance that exceeds a distance difference threshold.

15. The mobile device of claim 13, wherein the at least one processor is further configured to:
    determine a delay between a time of receiving the data from the IMU and a time of positioning of the virtual object based on the data from the IMU.

16. The mobile device of claim 15, wherein the virtual object is determined as the unauthorized virtual object when the difference is the delay being greater than a delay threshold.

17. The mobile device of claim 13, wherein the at least one processor is further configured to:
    perform an action to increase security of the mobile device when the virtual object is determined to be the unauthorized virtual object.

18. The mobile device of claim 17, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

19. The mobile device of claim 13, wherein the at least one processor is further configured to:
categorize a risk level of the unauthorized virtual object.

20. The mobile device of claim 19, wherein the at least one processor is further configured to:
identify the unauthorized virtual object.

21. The mobile device of claim 20, wherein the at least one processor is further configured to:
determine the risk level as low risk when the unauthorized virtual object is unlikely to alter a user action; and
determine the risk level as high risk when the unauthorized virtual object is likely to alter a user action.

22. The mobile device of claim 19, wherein the risk level of the unauthorized virtual object is based on at least one of a user's characteristic or a user's context.

23. The mobile device of claim 13, wherein the at least one processor configured to detect the virtual object comprises the at least one processor configured to:
compare the image from the camera to an image displayed on the display.

24. The mobile device of claim 13, wherein the unauthorized virtual object is a virtual object inserted by an unauthorized entity.

25. A mobile device configured to detect an unauthorized virtual object, comprising:
means for receiving an image from a camera;
means for detecting a virtual object displayed on a display of a mobile device included in the image;
means for receiving data from an inertial measurement unit (IMU) after a movement of the mobile device;
means for determining an estimated new position of the virtual object based on the data received from the IMU;
means for determining an actual position of the virtual object after receiving the data from the IMU;
means for determining a difference between the estimated new position and the actual position of the virtual object; and
means for determining whether the virtual object is the unauthorized virtual object based on the difference.

26. The mobile device of claim 25, wherein the difference is a distance that exceeds a distance difference threshold.

27. The mobile device of claim 25, further comprising:
means for determining a delay between a time of receiving the data from the IMU and a time of positioning of the virtual object based on the data from the IMU.

28. The mobile device of claim 27, wherein the virtual object is determined as the unauthorized virtual object when the difference is the delay being greater than a delay threshold.

29. The mobile device of claim 25, further comprising:
means for performing an action to increase security of the mobile device when the virtual object is determined to be the unauthorized virtual object.

30. The mobile device of claim 29, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

31. The mobile device of claim 25, further comprising:
means for categorizing a risk level of the unauthorized virtual object.

32. The mobile device of claim 31, further comprising:
means for identifying the unauthorized virtual object.

33. The mobile device of claim 32, further comprising:
means for determining the risk level as low risk when the unauthorized virtual object is unlikely to alter a user action; and
means for determining the risk level as high risk when the unauthorized virtual object is likely to alter a user action.

34. The mobile device of claim 31, wherein the risk level of the unauthorized virtual object is based on at least one of a user's characteristic or a user's context.

35. The mobile device of claim 25, wherein the means for detecting the virtual object further comprises:
means for comparing the image from the camera to an image displayed on the display.

36. The mobile device of claim 25, wherein the unauthorized virtual object is a virtual object inserted by an unauthorized entity.

37. A non-transitory computer-readable medium storing computer-executable instructions that, when executed by a mobile device configured to detect an unauthorized virtual object, cause the mobile device to:
receive an image from a camera;
detect a virtual object displayed on a display of a mobile device included in the image;
receive data from an inertial measurement unit (IMU) after a movement of the mobile device;
determine an estimated new position of the virtual object based on the data received from the IMU;
determine an actual position of the virtual object after receiving the data from the IMU;
determine a difference between the estimated new position and the actual position of the virtual object; and
determine whether the virtual object is the unauthorized virtual object based on the difference.

38. The non-transitory computer-readable medium of claim 37, wherein the difference is a distance that exceeds a distance difference threshold.

39. The non-transitory computer-readable medium of claim 37, further comprising computer-executable instructions that, when executed by the mobile device, cause the mobile device to:
determine a delay between a time of receiving the data from the IMU and a time of positioning of the virtual object based on the data from the IMU.

40. The non-transitory computer-readable medium of claim 39, wherein the virtual object is determined as the unauthorized virtual object when the difference is the delay being greater than a delay threshold.

41. The non-transitory computer-readable medium of claim 37, further comprising computer-executable instructions that, when executed by the mobile device, cause the mobile device to:
perform an action to increase security of the mobile device when the virtual object is determined to be the unauthorized virtual object.

42. The non-transitory computer-readable medium of claim 41, wherein the action to increase the security includes at least one of generating a warning icon, notifying a critical person, terminating a connection to a public network, flagging an incident of finding the unauthorized virtual object, reducing one or more thresholds for detecting the unauthorized virtual object, or requesting for an authentication from a user.

43. The non-transitory computer-readable medium of claim 37, further comprising computer-executable instructions that, when executed by the mobile device, cause the mobile device to:
categorize a risk level of the unauthorized virtual object.

44. The non-transitory computer-readable medium of claim 43, further comprising computer-executable instructions that, when executed by the mobile device, cause the mobile device to:
identify the unauthorized virtual object.

45. The non-transitory computer-readable medium of claim 44, further comprising computer-executable instructions that, when executed by the mobile device, cause the mobile device to:
determine the risk level as low risk when the unauthorized virtual object is unlikely to alter a user action; and
determine the risk level as high risk when the unauthorized virtual object is likely to alter a user action.

46. The non-transitory computer-readable medium of claim 43, wherein the risk level of the unauthorized virtual object is based on at least one of a user's characteristic or a user's context.

47. The non-transitory computer-readable medium of claim 37, wherein the computer-executable instructions that, when executed by the mobile device, cause the mobile device to detect the virtual object comprise computer-executable instructions that, when executed by the mobile device, cause the mobile device to:
compare the image from the camera to an image displayed on the display.

48. The non-transitory computer-readable medium of claim 37, wherein the unauthorized virtual object is a virtual object inserted by an unauthorized entity.

* * * * *